United States Patent [19]

Drone et al.

[11] 3,910,367
[45] Oct. 7, 1975

[54] CRAWLER TRACTOR OSCILLATING BEAM MOUNTING

[75] Inventors: Gary A. Drone, Springfield, Ill.; James M. Schnepp, Mesa, Ariz.

[73] Assignee: Fiat-Allis Construction Machinery, Inc., Deerfield, Ill.

[22] Filed: May 10, 1974

[21] Appl. No.: 468,670

[52] U.S. Cl. .................................. 180/9.5; 280/111
[51] Int. Cl.² ......................................... B62D 55/00
[58] Field of Search .......... 180/9.5, 9.6; 305/25, 27; 280/111, 104

[56] References Cited
UNITED STATES PATENTS

| | | | |
|---|---|---|---|
| 3,177,961 | 4/1965 | Potter | 180/9.5 |
| 3,576,226 | 4/1971 | Copeland | 180/9.5 |
| 3,635,302 | 1/1972 | Rogers | 280/111 |
| 3,679,196 | 7/1972 | Royer | 280/111 |
| 3,825,088 | 7/1974 | Copeland | 180/9.5 |
| 3,828,874 | 8/1974 | Council | 180/9.6 |

Primary Examiner—Philip Goodman
Assistant Examiner—John A. Carroll

[57] ABSTRACT

A tractor comprises a main frame, an oscillating beam support subassembly mounted on the main frame, an oscillating beam mounted on the beam support for limited pivotal movement about the longitudinal axis of the tractor, and laterally spaced crawler units connected to the ends of the oscillating beam. The subassembly comprises a pair of longitudinally spaced apart vertically depending cross members, each having a mounting flange thereon. The oscillating beam is provided with a hole near the center thereof for receiving a pivot pin which is non-rotatably press-fitted therein. The ends of the pivot pin extend outwardly of the hole and are supported for pivotal movement in holes extending through bearing blocks which, in turn, are releasably bolted to the mounting flanges. Clearance between the ends of the pivot pin and the cross members is such as to prevent axial endwise shifting of the pivot pin if any such tendency should develop.

9 Claims, 3 Drawing Figures

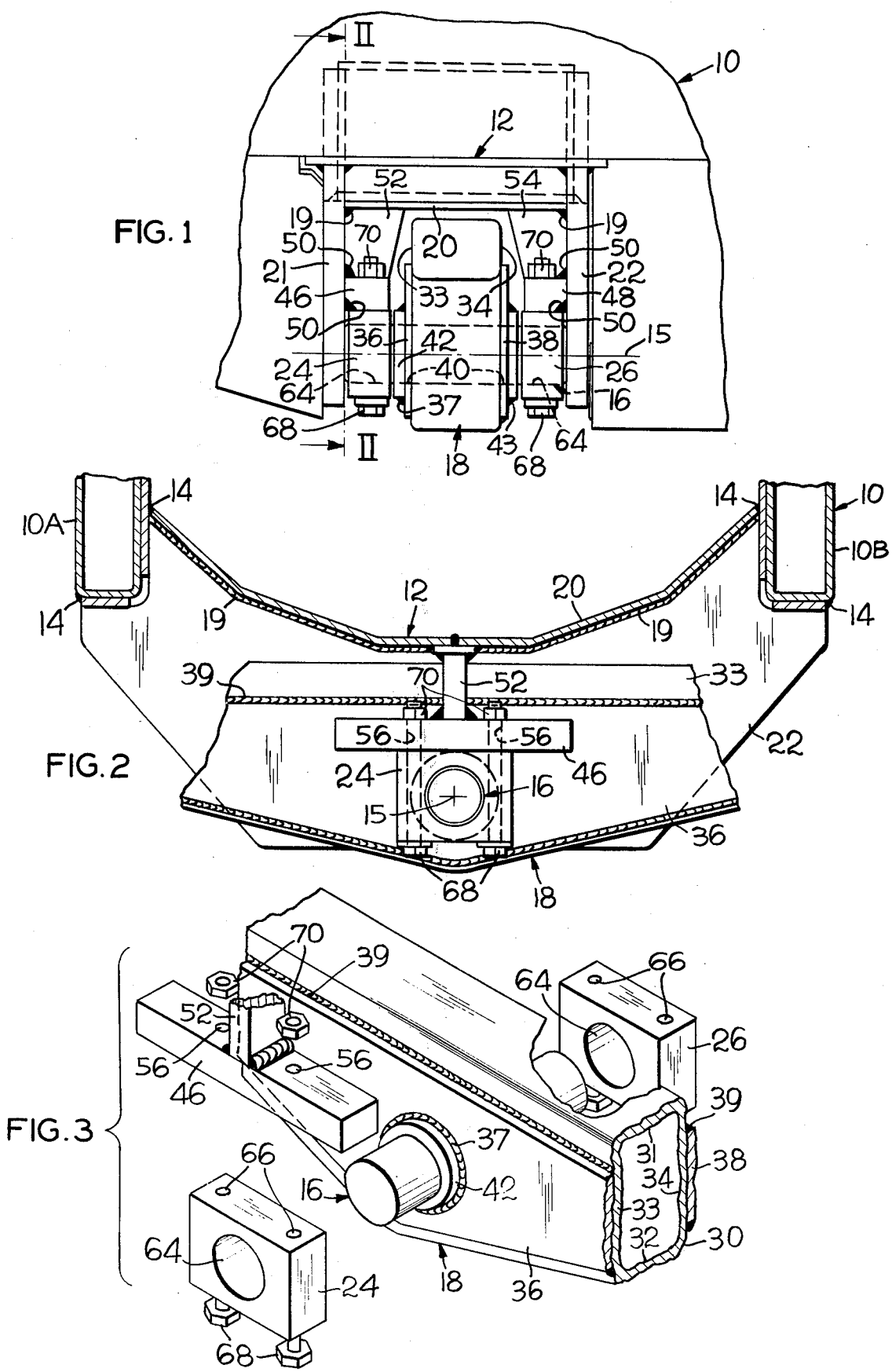

CRAWLER TRACTOR OSCILLATING BEAM MOUNTING

BACKGROUND OF THE INVENTION

1. Field of Use

This invention relates generally to means for mounting oscillating beams on the main frames of vehicles such as crawler tractors.

2. Description of the Prior Art

Crawler tractors typically employ an oscillating beam to support the engine-carrying main frame of a tracked vehicle on its horizontally spaced tracks. The following patents disclose various prior art means and arrangements for mounting such an oscillating beam on the tractor frame by means of a pivot pin: U.S. Pat. Nos. 3,679,196, 3,010,530, 2,340,134 and 2,049,858. In another prior art arrangement it was the practice to weld longitudinally spaced notched cross plates between the main frame longitudinal side members and then to weld heavy blocks into the notches to provide mounting pads for the beam pivot pin. After installation, the mounting pads were then milled flat, drilled and blind tapped. The pivot pin extended through bushings installed in a bore machined in the oscillating beam. The pivot pin, which had two flates machined thereon to adapt it to seat on the pads, was then secured to the mounting pads with cap screws extending through other blocks that had been bored to close fit with the pin and milled to the same level as the pin flat. By this means, the pin was clamped and restrained from turning or moving axially. Thus, the oscillating beam rode on what is called a "dead" shaft.

The disadvantages of the aforedescribed prior art arrangement are as follows. The method of fabrication and assembly was complicated, involved close tolerances and numerous pieces and was costly. Furthermore, due to the milled pads necessarily being well above the center of the pin, very thick plates of high strength material were used to achieve the strength and rigidity required. Also, the pin diameter was limited due to the use of bushings in the oscillating beam bore, and the pin was further weakened by machining of the clamping flats. In addition, the bushings had a tendency to seize on the pin, thereby causing the pin to turn, whereupon it could then work loose in the blocks and sometimes move forward or rearward out of the blocks. If the bushings wore loose, the oscillating beam had to be completely removed and the old bushings pressed out and new ones installed. Another disadvantage was that the capscrews fastening the beam to the main frame tended to rust and corrode and could not be loosened, often resulting in being broken off in the blind tapped hole. Furthermore, during manufacture the entire main frame assembly after being welded together had to be machined to provide the flat mounting pads and tapped holes with a close locating tolerance relative to the rear of the frame. This was expensive due to the size of the structure. Also, since the capscrews fastening the beam to the main frame were relatively short, their torque retention ability was limited. Finally, the pin was difficult to manufacture because, after heat treatment, it was harder than the machinability range, necessitating the flats to be cut prior to heat treatment. During heat treatment the flats had a tendency to twist out of plane and then would not seat properly against the mounting pads.

SUMMARY OF THE PRESENT INVENTION

In accordance with the present invention there is provided an improved means for mounting an oscillating beam to the main frame of a vehicle, such as a crawler tractor.

The tractor comprises a main frame, an oscillating beam support subassembly mounted on the main frame, an oscillating beam mounted on the beam support for limited pivotal movement about the longitudinal axis of the tractor, and laterally spaced crawler units connected to the ends of the oscillating beam. The subassembly comprises a pair of longitudinally spaced apart vertically depending cross members, each having a mounting flange thereon. The oscillating beam is provided with a hole near the center thereof for receiving a pivot pin which is non-rotatably press-fitted therein. The ends of the pivot pin extend outwardly of the hole and are supported for pivotal movement in holes extending through bearing blocks which, in turn, are releasably bolted to the mounting flanges. Clearance between the ends of the pivot pin and the cross members is such as to prevent axial endwise shifting of the pivot pin if any such tendency should develop.

Means in accordance with the present invention enable cost reduction through simplicity of components, provide a stronger main frame structure with less material, and provide a stronger pivot pin without exceeding the limits of available space. Furthermore, such means eliminate problems experienced in service such as turning of the pin in its clamping blocks, thereby causing pin to work out; difficulty of repairing wearable items; and retention of capscrews due to rust and corrosion in blind threaded holes in major components. Also, in accordance with the invention there is provided a main frame cross beam assembly or basket that can be prefabricated and machined prior to installation in the main frame welded assembly, thus saving expenditures for capital equipment. In addition, costly wear on bushings is eliminated because the pin is pressed into the beam hole. Also, longer capscrews which have more linear stretch per unit of torque than shorter screws, thereby making for better torque retention and security in service. And, the manufacturing problem of maintaining pin flats "in plane" after heat treating is eliminated. Other objects and advantages of the invention will hereinafter appear.

DRAWINGS

FIG. 1 is a side elevation view of a portion of a tractor frame showing a side view of the oscillating beam support subassembly mounted thereon and an end view of an oscillating beam mounted on the subassembly in accordance with the invention;

FIG. 2 is a view of the subassembly and oscillating beam taken on line II—II of FIG. 1; and FIG. 3 is an exploded perspective view of portions of the subassembly and of the oscillating beam shown in FIGS. 1 and 2.

DESCRIPTION OF PREFERRED EMBODIMENTS

Referring to FIGS. 1 and 2, the numeral 10 designates the main frame of a vehicle such as a crawler tractor. Main frame 10 comprises two laterally spaced apart longitudinal main frame members 10A and 10B which take the form of steel box girders. A cross member subassembly 12 is rigidly secured between the frame members 10A and 10B, as by welding at 14, and it is connected as hereinafter explained to a pivot pin 16 which has its axis of rotation 15 extending longitudinally and parallel to the vehicle axis. Pivot pin 16 is connected as hereinafter explained to an oscillating beam 18 which is mounted for limited pivotal movement with respect to main frame 10 about the axis of pin 16.

Subassembly 12, which is fabricated and machined as a complete independent unit, is attached to the main frame 10 after all fabrication and machining operations have been performed thereon. Subassembly 12 comprises a rigid upper plate 20 bent or formed as shown in FIG. 2, a pair of longitudinal spaced apart rigid depending cross plates or members 21 and 22 which are rigidly secured as by welding at 19 to upper plate 20. The subassembly 12 provides a deep cross section which uses relatively less material but is stronger than prior art arrangements. Cross plates 21 and 22 are longitudinally spaced apart from each other a sufficient distance to enable oscillating beam 18 and a pair of bearing blocks or retaining blocks or caps 24 and 26, and pin 16 to be disposed therebetween. More specifically, the spacing between the cross plates 21 and 22 is slightly greater than the length of pin 16 so that the pin and beam 18 are free to rotate but so that the cross plates restrict fore and aft (axial) shifting or movement of the pin if the pin works loose from its press fit on beam 18 while it is in place between the plates.

As FIG. 3 shows, oscillating beam 18 takes the form of a hollow steel box-like girder 30 having upper, lower, front and rear sides 31, 32, 33 and 34, respectively. The lower side 32 of box girder 30 tapers upwardly and outwardly from the center of beam 18. The front side 33 and rear side 34 of girder 30 are provided with reinforcing plates 36 and 38, respectively, which are secured thereto as by welding along the edges as at 39. Oscillating beam 18 is provided with a centrally located circular hole 40 which extends therethrough in the fore and aft direction through the reinforcing plates 36 and 38 and the sides 33 and 34 of girder 30. Toroidally shaped collars 42 and 43 are welded around their peripheral edges as at 37 to the outside surfaces of the reinforcing plates 36 and 38, respectively, and afford additional support for pin 16, as well as strengthening the edges of hole 40. Pin 16 is non-rotatably press-fitted or friction-fitted into hole 40 in the oscillating beam 18 during manufacture, rather than being supported by bushings (not shown) disposed in hole 40 as in some prior art arrangements, thereby making the pin a "live" shaft, i.e., rotatable about its axis as beam 18 oscillates. This means of securing the pin 16 to beam 18 enables the diameter of the pin to be substantially as large as the diameter of the bore or hole 40 in the oscillating beam 18, instead of being only as large as the inside diameter of a bushing, thereby resulting in a relatively larger, stronger pin. It should also be noted that the pin 16 is a totally cylindrical member and is not provided with any flats, notches, grooves, or holes of any other machined configurations which would tend to weaken its basic cylindrical shape.

The inner surface of the cross plates 21 and 22 are provided with rigid flange members or mounting pads 46 and 48 in the form of rectangular bars which are welded to the inwardly facing surfaces of the cross plates 21 and 22, respectively, as at 50. Reinforcing plates, brackets or gussets 52 and 54 are welded to the bottom surface of top plate 20, the inner surfaces of the end plates 21 and 22, and the top surfaces of the pads 46 and 48, respectively, to further rigidly reinforce and strengthen the subassembly 12. The pads 46 and 48 are each provided with a pair of spaced apart screw mounting holes 56 which extend vertically completely therethrough between the upper and lower surfaces of the pads.

The bearing blocks 24 and 26 are provided for supporting the free ends of pin 16 and each is provided with a bored hole 64 in its center extending horizontally completely therethrough between the front and rear surfaces of the block for accommodating pin 16. Each block 24 and 26 is further provided with two drilled holes 66 extending vertically completely therethrough between the upper and lower surfaces of the block for accommodating capscrews or threaded bolts 68 which extend therethrough and through the holes 56 in the associated pad 46 and 48 to secure the blocks 24 and 26, respectively, to the pads 46 and 48, respectively, of subassembly 12. Each bearing block 24 and 26 has a relatively simple cube-like geometric configuration and is easily and economically fabricated. The bored holes 66 need not make a close tolerance fit with their associated bolts 68, as in previous designs, and no milling of the holes 66 is required. The bores 64 in the blocks 24 and 26 are hardened by heat treatment for good wear resistance but the bore surfaces are softer than the material of which pin 16 is fabricated. The sizes of the blocks 24 and 26 and the pads 46 and 48 are such that relatively long bolts 68 are used therewith, thereby providing better torque retention qualities than would relatively shorter bolts. The bolts 68 are inserted for use so that their associated nuts 70 are on the upwardly pointing end of the bolts. Thus, if the bearing blocks 24 and 26 should wear and need replacement, the bolts 68 are removed and beam 18 dropped down, whereupon the blocks are then slipped off of the ends of pin 16 and new ones are installed. In the event the threads of the bolts 68 are rusted or corroded, the nuts 70 can be burned off without damage to any related part, such as the bearing blocks 24 or 26 or the pin 16.

During manufacture, subassembly 12 is fabricated as a single unit comprising top plate 20, cross plates 21 and 22, the flange members 46 and 48, and the gussets 52 and 54. The flange members or pads 46 and 48 are provided with the bolt holes 56 prior to being welded in place on the end plates. The fully assembled subassembly 12 is then jigged and welded in place on main frame 10. The fully assembled oscillating beam 18, with its pivot pin 16 force-fitted in place, is then supported horizontally and the bearing blocks 24 and 26, which have been pre-drilled and heat treated, are then slipped in place on the ends of pin 16. The oscillating beam 18, with the bearing blocks 24 and 26 in place on its pin 16, is then raised up between the spaced apart cross plates 21 and 22 of subassembly 12, and the bolts 68 are inserted through the holes 66 in the blocks and through the holes 56 in the pads 46 and 48, whereupon the nuts 70 are secured on the bolts and then tightened. The oscillating beam 18 is thus completely attached to subassembly 12 on the main frame 10 and is able to pivot with respect thereto.

We claim:

1. In a vehicle: an oscillating beam, and means for releasably mounting said beam on said vehicle comprising a mounting assembly connected to said vehicle and including a pair of vertically disposed support members spaced apart a predetermined distance to define a space open at the bottom and in which said beam is pivotably mountable, with opposite sides of said beam confronting said support members, pin means nonrotatably connected to said beam and having pin ends projecting from opposite sides of said beam, each pin end having a circular transverse cross section, the distance between the outer end surfaces of said pin ends being less than said predetermined distance but sufficient to prevent substantial axial shifting of said pin means, a bearing member removably supported on each pin end for pivotally supporting said beam on said mounting assembly, each bearing member having a circular bore therein for accommodating a pin end and by means of which said bearing member is removably supported on a pin end, said bore extending completely through said bearing member whereby the outer end surface of an associated pin end is adjacent an associated support member, bearing support means mounted on said mounting assembly between said support members, and connecting means for releasably connecting each bearing member to said bearing support means of said mounting assembly.

2. A vehicle according to claim 1 wherein said beam is provided with a pin-receiving hole extending therethrough from said opposite sides thereof and wherein said pin means comprises a pin force-fitted and frictionally engaged in said pin-receiving hole whereby relative movement between said beam and said pin is prevented.

3. A vehicle according to claim 1 wherein said connecting means comprises a releasable threaded connecting member for each bearing member, a first hole in each bearing member for accommodating said connecting member, said first hole being transverse to the bore in its associated bearing member, and a second hole in said bearing support means of said mounting assembly and in registry with said first hole for accommodating said connecting member.

4. A vehicle according to claim 2 wherein said pin means is cylindrical and wherein said bore in each of said bearing members is cylindrical.

5. A vehicle according to claim 3 wherein said threaded connecting member is a capscrew, wherein said first hole accommodates the shank of said capscrew, and wherein said second hole is a threaded hole for receiving the threaded end of said capscrew in threaded engagement.

6. In a vehicle: an oscillating beam, and means for releasably mounting said beam on said vehicle comprising a mounting assembly connected to said vehicle and including a pair of vertically disposed spaced apart support members defining a space open at the bottom and in which said beam is pivotally mountable, each support member having bearing support means thereon within said space, a pair of spaced apart threaded bolt holes in each bearing support means, pin means nonrotatably connected to said beam and having cylindrical pin ends projecting from opposite sides of said beam, the distance between the outer end surfaces of said pin ends being less than the distance between said support members but sufficient to prevent substantial axial shifting of said pin means, a bearing member removably supported on each pin end for pivotally supporting said beam on said mounting assembly, each bearing member having a cylindrical bore extending therethrough for accommodating pin end and whereby the outer end surface of a pin end is adjacent an associated support member, the bore in each bearing member serving as a means by which the bearing member is removably supported on its associated pin end, each bearing member having a pair of spaced bolt holes therethrough transverse to said bore and in registry with said pair of threaded bolt holes in said bearing support means, and connecting means including a pair of bolts for each bearing member, each bolt extending through a bolt hole in a bearing member and into a threaded bolt hole in said bearing support means for releasably connecting each bearing member to an associated one of said bearing support means.

7. A vehicle according to claim 6 wherein said beam is provided with a cylindrical pin-receiving hole extending therethrough from said opposite sides thereof and wherein said pin means comprises a cylindrical pin force-fitted and frictionally engaged in said pin-receiving hole whereby relative movement between said beam and said pin is prevented.

8. A vehicle according to claim 6 wherein said bearing support means on each support member comprises a member welded thereto.

9. A vehicle according to claim 8 wherein said mounting assembly comprises an upper plate to which said support members are welded and from which said support members depend.

* * * * *